A. Johnson,

Rolling Cornices.

No. 4,171. Reissued Nov. 1. 1870.

Witnesses:
C. L. Emerson
J. E. Hutchinson

Inventor:
Asa Johnson
per
Alexander Mason
Attys.

N. PETERS, PHOTO-LITHOGRAPHER, WASHINGTON, D. C.

United States Patent Office.

ASA JOHNSON, OF CAIRO, NEW YORK, FOR HIMSELF AND WILLIAM H. JOHNSON, ASSIGNEE OF ASA JOHNSON.

Letters Patent No. 18,906, dated December 22, 1857; reissue No. 4,171, dated November 1, 1870.

IMPROVEMENT IN MACHINES FOR ROLLING CORNICES.

The Schedule referred to in these Letters Patent and making part of the same.

*To all whom it may concern:*

Be it known that ASA JOHNSON, of Cairo, in the county of Greene and State of New York, did invent certain new and useful Improvements in "Machines for Making Metallic Cornice-Gutters and other Moldings;" and we do hereby declare that the following is a full, clear, and exact description thereof, reference being had to the accompanying drawing and to the letters of reference marked thereon.

The nature of his invention consists in the construction of a machine for forming corrugations of any desired shape in sheet metal successively, and so that all the corrugations made are held while the next one is being formed.

In order to enable others skilled in the art to which his invention appertains to make and use the same, we will now proceed to describe its construction and operation, referring to the annexed drawing, which forms a part of this specification, in which—

Figure 1:
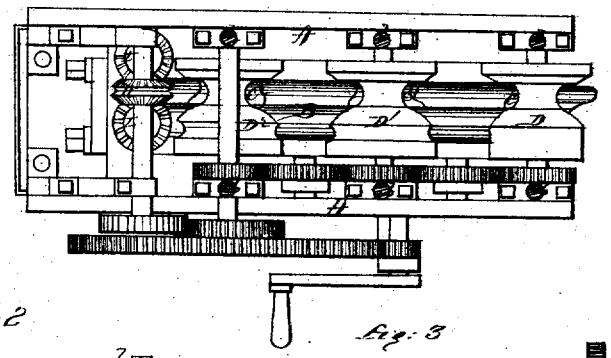
Figure 2:
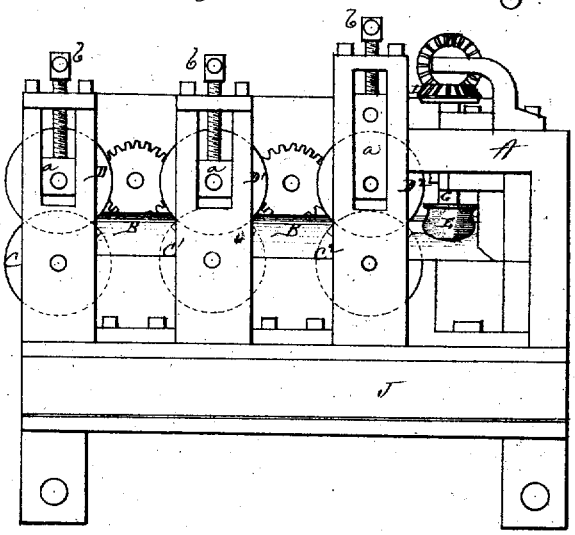

Figure 1 is a plan view;

Figure 2, a side view; and

Figure 3:
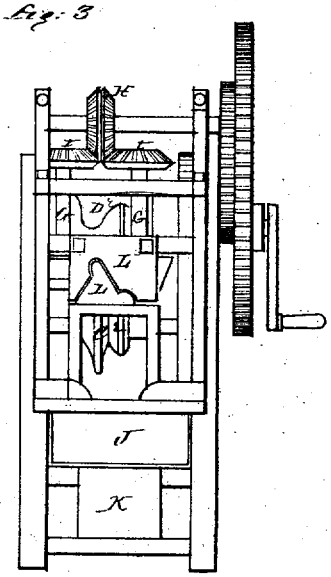

Figure 3, an end view of the machine.

A represents the frame of the machine, made in any suitable manner and dimensions to contain the various parts needed.

B is a bed or guide running longitudinally through the frame A, and which is made of the shape desired to be given to the sheet metal.

Under this guide, at suitable intervals, is placed a series of rollers, C $C^1$ $C^2$, each of which are so placed that the upper edges will be level or on a line with the upper surface of the guide B, said guide being slotted or cut out for this purpose immediately above the rollers.

Above the guide B is placed another series of rollers, D $D^1$ $D^2$, corresponding with the rollers under the guide, and these rollers have their bearings in movable or sliding journal-boxes *a a*, which are held down by the set-screws *b b*, so that the distance or space between the upper or lower rollers may be easily regulated.

The rollers C D, &c., are constructed in the following manner:

The first pair, C D, are constructed so as to form one corrugation when the sheet metal is passed between them. The next pair, $C^1$ $D^1$, are constructed so as to fit in the corrugation formed by the first pair, and to form a second corrugation. The third set, $C^2$ $D^2$, I have represented as being the same shape as the second set, $C^1$ $D^1$, which will stiffen the metal in the corrugations already formed.

This third set, or the next one, if more than three pairs are used, may be made to fit all the corrugations already formed, and form one more; and so on, as many sets of rollers as may be necessary to form the desired cornice.

It will readily be seen that the upper rollers D $D^1$ &c., hold the sheet metal on the lower rollers C $C^1$, &c., as well as on the stationary bed or die B, so that the corrugations already formed cannot be stretched while the next one is being formed.

All these rollers C D, &c., are connected by suitable gear-wheels, which need no description.

At the rear end of the machine are two horizontal rollers, E, placed side by side upon vertical shafts G G, which are operated by means of a double miter-wheel, H, gearing into miter-wheels I I on the upper ends of the shafts, the double wheel H receiving its motion from the train of gearing which operates the rollers C D.

One of these horizontal rollers E forms the gutter in the cornice as the sheet metal passes through on one side of the molding on the die B, while the other horizontal roller, on the other side of the molding, holds the sheet metal firmly to the said die B, so that the corrugation in the metal will not be drawn out of shape.

In this manner all the rollers, whether they work vertically or horizontally, operate in connection with the lower stationary bed or die B, to hold whatever corrugations are already formed, while they at the same time form an additional corrugation.

In the lower part of the frame A is a boiler, J, with furnace K underneath.

In the operation of this invention oil is put into the boiler J, which is to be made much longer in the practical machine than shown in the drawing, and of sufficient length, breadth, and depth, so that the sheets of metal from which the cornice is to be made may be placed in it under the rollers, and long enough, so that the sheets can be drawn back on a carriage, and raised up to rollers C D without being removed from the boiler, and it is to be made of sufficient height to cover the metal as it passes between the rollers. The oil is heated by means of fire in the furnace K. The machine is then put in motion, the sheets of metal drawn back onto a carriage, and placed in contact with the rollers C D, and by them drawn in and guided through the machine by means of all the rollers, and the guide B, which serve to keep the metal straight as it passes through between the rollers, and is by them successively and gradually formed. The sheet of metal then passes through or between the rollers E, which form the gutter, and it is then forced out through or between dies L L, which gives it perfect shape.

These dies L L are of the exact shape desired to be given to the sheet metal the same as the bed or die B; in fact, the lower one of the dies L is really a continuation or extension of the die B.

The sheet metal, or rather the front end thereof, as soon as it passes from between the horizontal rollers E E, comes in between the dies L L, said dies thus holding the metal on one side of the horizontal rollers, while the last set of the vertical rollers hold it on the other side.

If different styles of molding are required, different shaped rollers may be used corresponding with the shape required, and a sufficient number of them to successively form one molding or corrugation after another, without cracking or straining the metal.

If it is desired to form corrugated ogees, or any other shaped moldings, the last series of rollers is cut lengthwise to the corrugated shape desired, making them male and female, through which the cornice or molding passes, thus forming them into any required corrugated shape.

When different styles of molding are desired, the guide and dies, as well as the rollers, must be changed to suit.

It will be seen from the above that the different corrugations or moldings are formed successively, one after another, and that, as each corrugation is formed, those previously made are held firmly, whereby these corrugations are prevented from getting out of shape, and the sheet metal is also prevented from cracking or straining.

The forming the corrugations successively, and holding each and every corrugation while the succeeding one is being formed, being the essence of his invention, and this not having been accomplished before by anybody, we do not want to confine ourselves to any specific mechanism, as it is evident that the same result might be accomplished by other means. For instance, dies or stamps, operating in succession, may be made to hold a corrugation while the next one is being formed.

Having thus fully described his invention,

What we claim as new, and desire to secure by Letters Patent, is—

1. In a machine for corrugating sheet metal, a series of sets of grooved rollers, of which the rollers of the first set shall have one groove to form a single corrugation, and the second the same groove as the first, and one more, and so on for as many corrugations as is desired, so that the corrugations will not only be formed successively, but each and every corrugation will be firmly held during the formation of the remainder, as set forth.

2. The die or bed B, in combination with the forming-roller E, and holding-rollers $C^2$ $D^2$, as and for the purposes set forth.

3. In combination with sets of rollers grooved relatively to each other, as described, the horizontal rollers E E and dies B L L, as described, for the purposes set forth.

4. The arrangement of the series of rollers C D, $C^1$ $D^1$, $C^2$ $D^2$, bed or die B, rollers E E, and dies L L, for the purpose of forming sheet metal into cornices and gutters for buildings while hot, and passing it through the machine in boiling oil, as described, and for the purposes set forth.

In testimony that we claim the foregoing, we have hereunto set our hands this 25th day of June, 1870.

ASA JOHNSON.
WM. H. JOHNSON.

Witnesses to signature of A. JOHNSON:
EDM. F. BROWN,
C. L. EVERT.
Witnesses to signature of W. H. JOHNSON:
JOHN H. SCHOLL,
CHARLES WILLE.